Oct. 10, 1950  R. G. MINARIK  2,525,042
ROTARY PAD CUTTING MACHINE AND METHOD
Filed Dec. 20, 1946  6 Sheets-Sheet 6
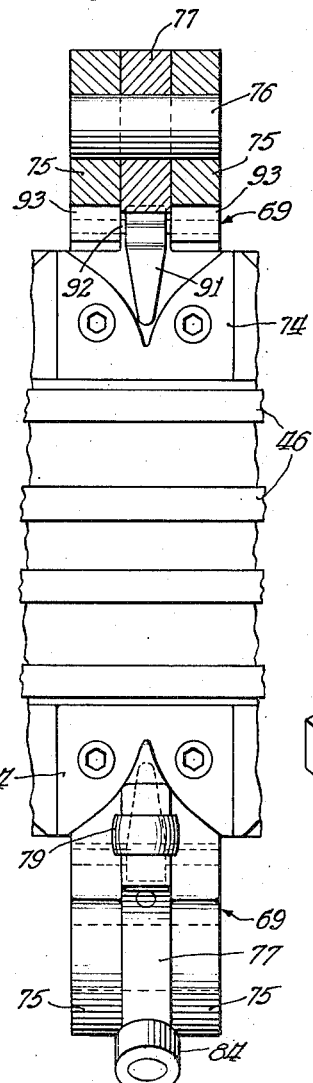
Fig. 9
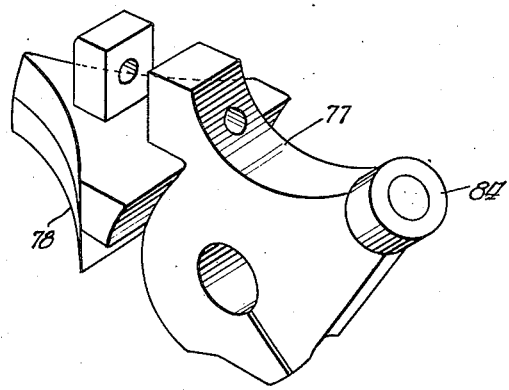
Fig. 10
Fig. 11
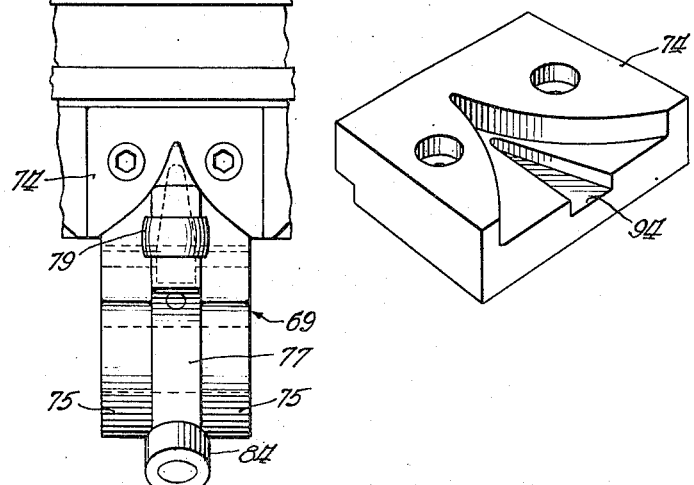
Fig. 12
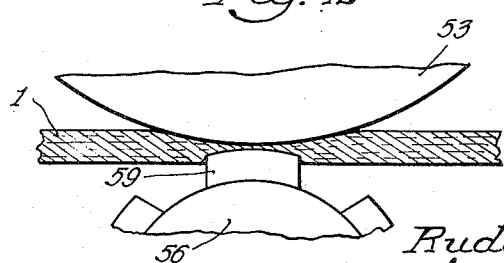
Inventor:
Rudolf G. Minarik
By: Soans, Pond & Anderson
Attys.

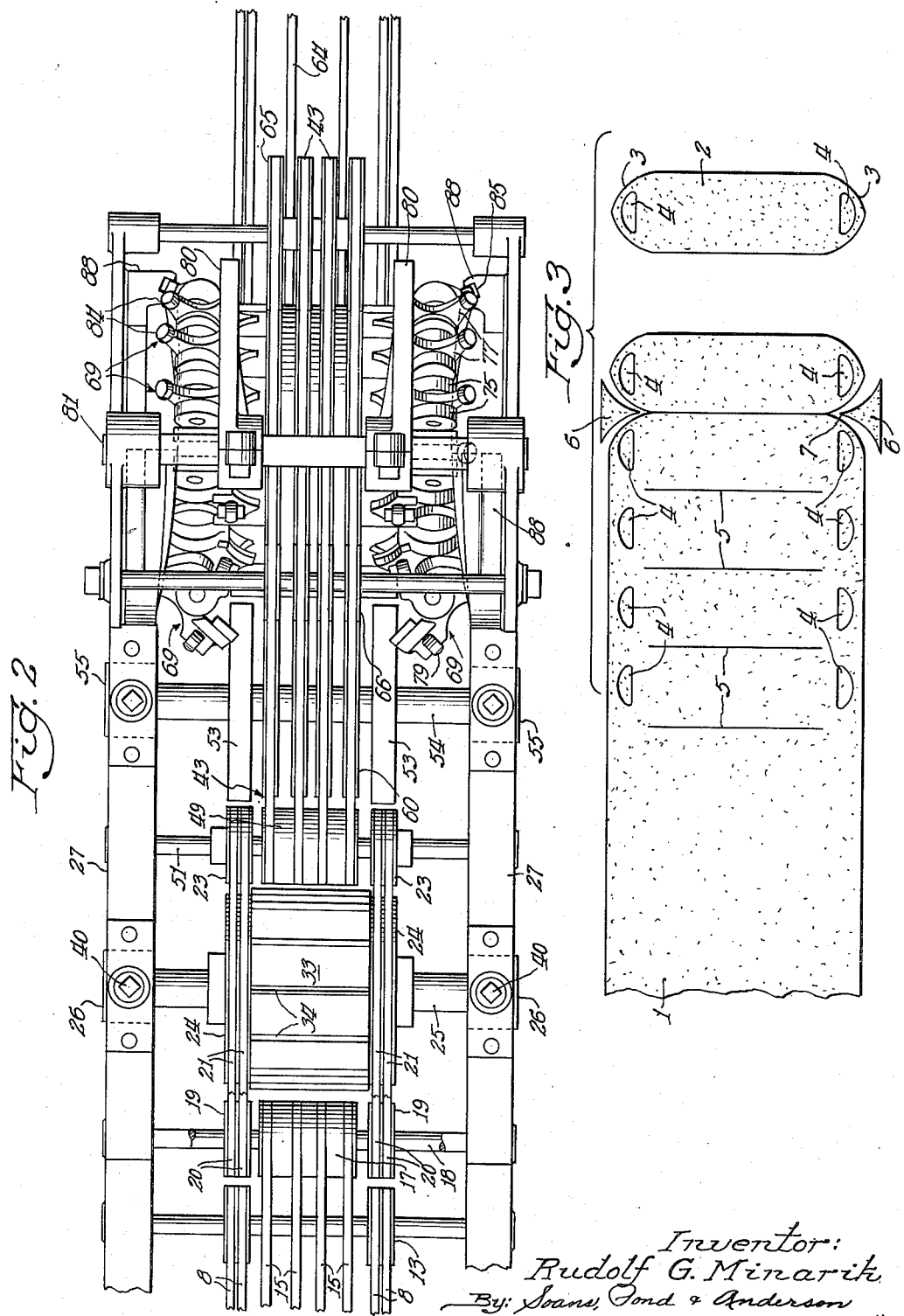

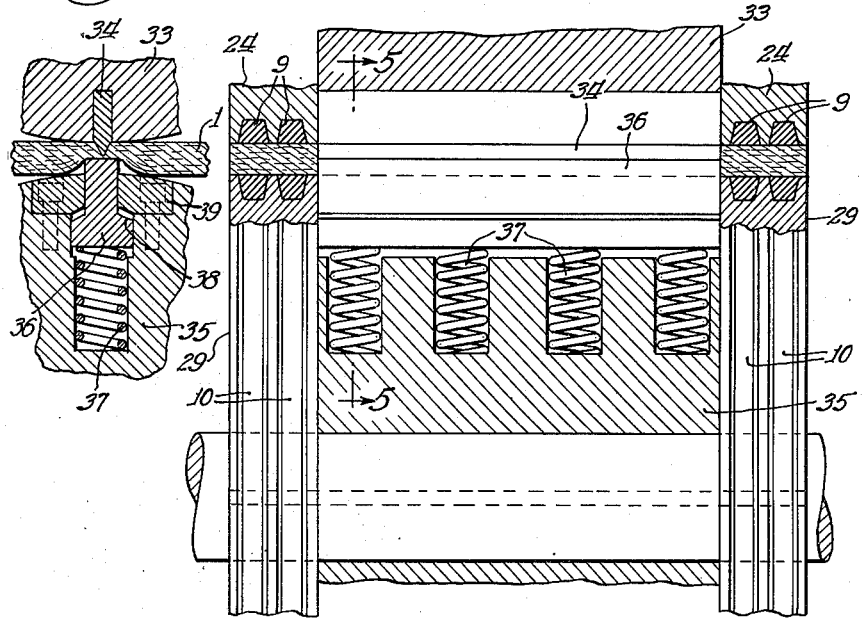

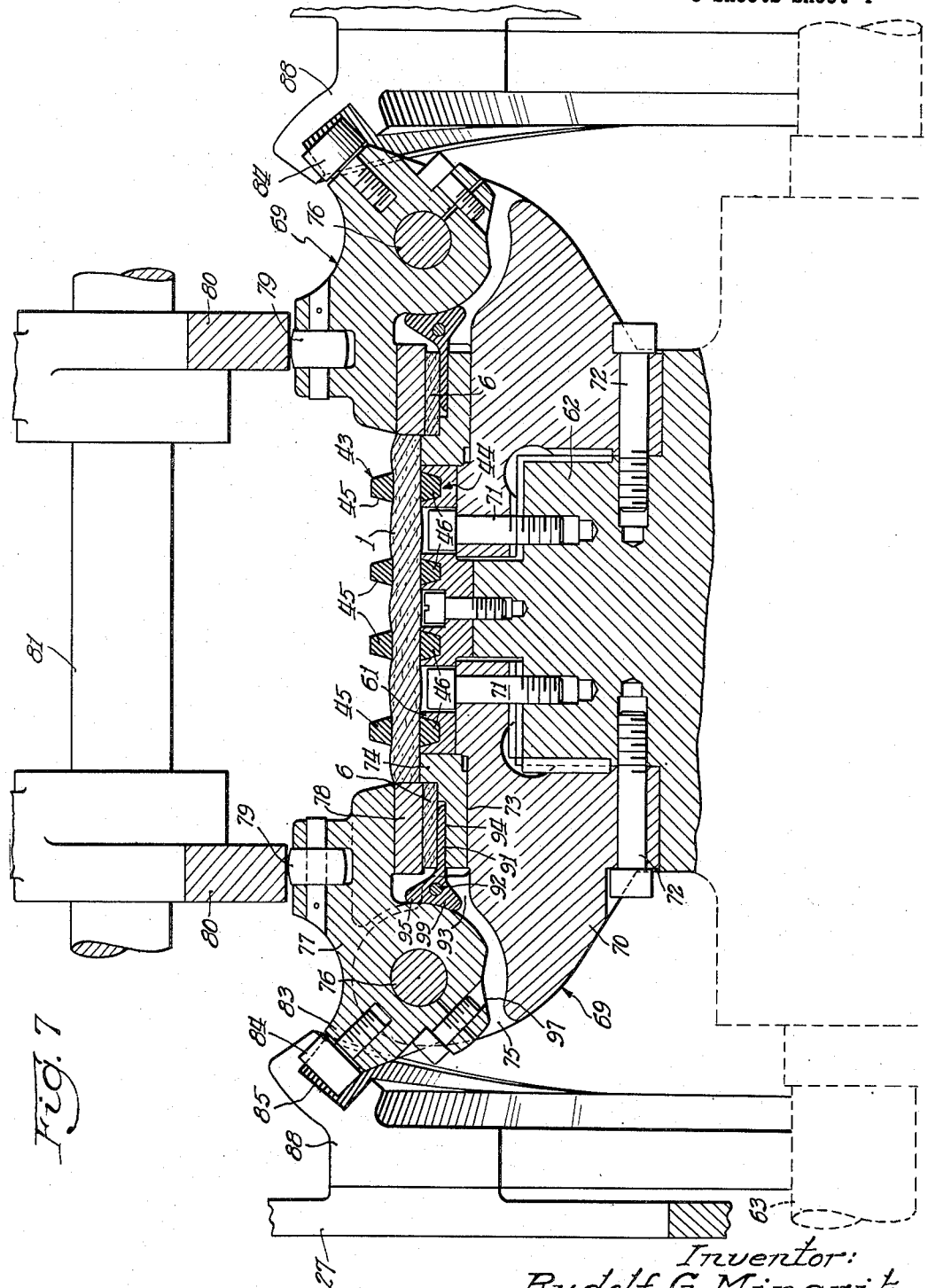

Patented Oct. 10, 1950

2,525,042

UNITED STATES PATENT OFFICE 2,525,042

ROTARY PAD CUTTING MACHINE AND METHOD

Rudolf G. Minarik, Neenah, Wis., assignor to International Cellucotton Products Company, Chicago, Ill., a corporation of Delaware Application December 20, 1946, Serial No. 717,396

15 Claims. (Cl. 154—29)

1

This invention relates to a method and equipment for cutting sanitary napkin or like absorbent pad bodies from a web of absorbent pad material. More particularly, the present invention is concerned with a method whereby round-ended pads are cut from a continuously propelled web of pad material and to rotary cutting apparatus for carrying out the indicated method.

The main objects of the invention are to provide a high speed, quietly operating method and apparatus for cutting from a web of pad material absorbent pads of the character indicated; to provide mechanism of the character indicated which will be of relatively simple form, and which will be highly efficient in practicing the indicated pad cutting method.

Other objects and advantages of the invention will be understood by reference to the following specification and accompanying drawings (6 sheets) wherein there is disclosed a rotary pad cutting machine and an improved pad cutting method embodying a selected form of the invention.

In the drawings:

Fig. 2 is a plan view of the machine;

Fig. 3 is a plan view of a web of pad material illustrating the successive steps performed thereon in cutting the web into separate pad sections;

Fig. 4 is a section on the line 4—4 of Fig. 1;

Fig. 5 is a section on the line 5—5 of Fig. 4;

Fig. 6 is a section on the line 6—6 of Fig. 1;

Fig. 7 is a section on the line 7—7 of Fig. 1;

Fig. 9 is a fragmentary plan view illustrating some of the parts appearing in Fig. 7;

Figs. 10 and 11 are perspectives illustrating certain elements of the pad cutting mechanism; and Fig. 12 is a fragmentary enlarged illustration of a portion of the apparatus appearing also in Fig. 1.

Figure 1:
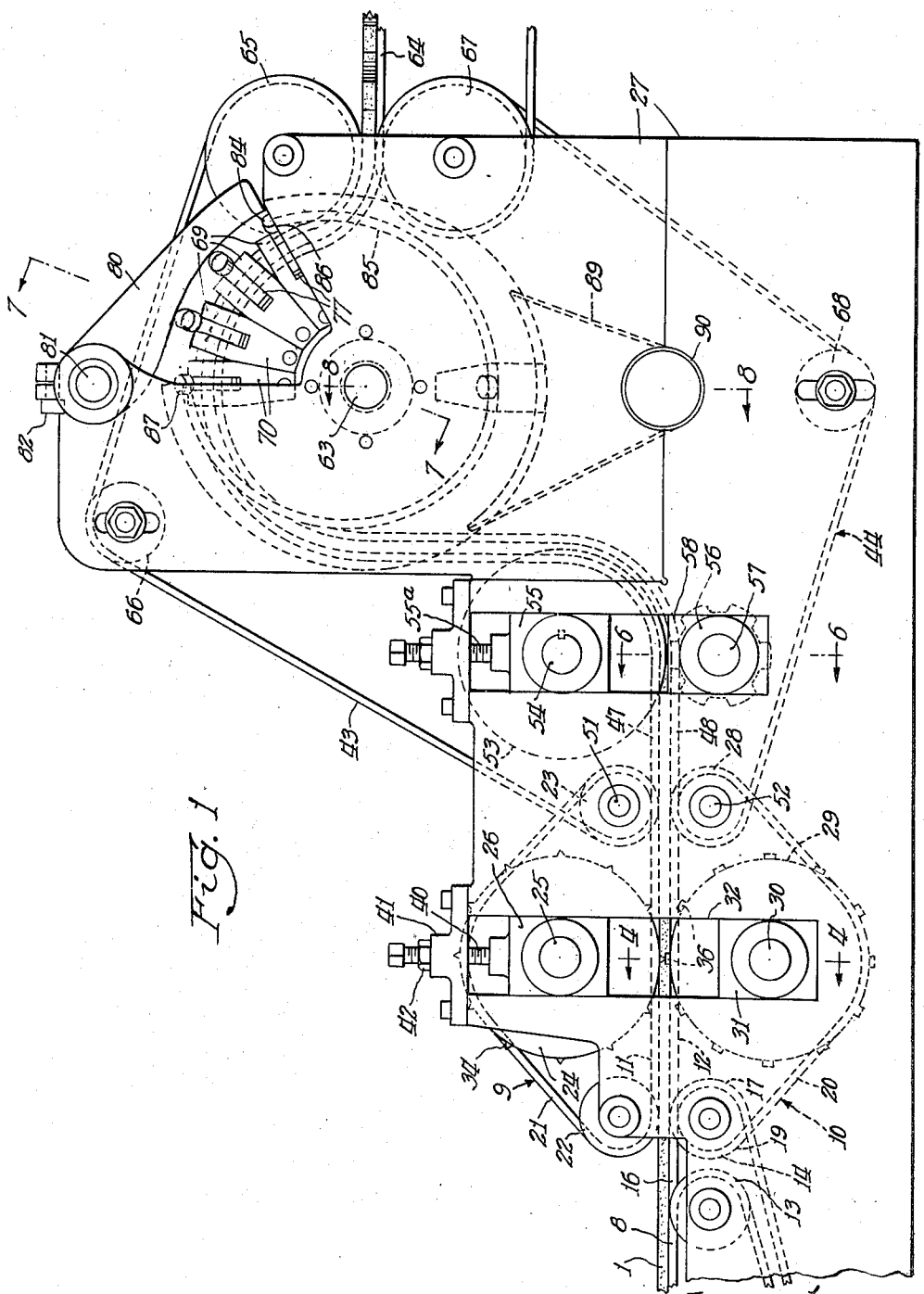
Fig. 1 is a side elevation of the improved rotary pad cutting machine.

A continuous web 1 of suitable absorbent pad material suitable for forming sanitary napkin pads or other absorbent pads is selected and the required width, which, in this instance, corresponds to the overall length of the sanitary napkin pads 2 which are to be produced (see Fig. 3). The pad 2 as shown in Fig. 3 has rounded ends 3—3 and embossed, compressed end areas 4—4 substantially in accordance with the disclosure of Glomstead Patent No. Re. 21,076. In cutting such a pad from the web or blanket 1, the web may first be slitted transversely as indicated at 5 to define sections of a width corresponding to the required width of the pad to be produced. Either simultaneously with the slitting of the web or subsequently thereof, preferably the latter, the areas 4 are compressed to the desired extent at the ends of the sections defined by the slits 5.

2

After the slitting and compression is completed, the web has its margin notched by removing generally triangular pieces represented at 6, said pieces having their inner points or apices 7 terminating at the ends of the respective slits 5 whereby the margins of the web which hold the sections together are severed so as to permit separation of the sections from the web or blanket.

The mechanism herein shown for cutting pads by the method illustrated in Fig. 3 is of the form of a continuously operating rotary apparatus. The blanket of material 1 is fed by a conveyor 8 between upper and lower conveyors 9 and 10, respectively, which have parallel adjacent reaches 11 and 12, respectively.

For carrying the pad material blanket 1 over the gap between the delivery end 13 of the conveyor 8 and the receiving end 14 of the conveyor 10, a plurality of narrow conveyor belts 15 having an upper reach 16 in co-planar relation to the upper reaches of the belts 8 may extend around a delivery end pulley 17 which is carried by the shaft 18 which also carries receiving end pulleys 19 of the lower conveyor 10. By reference to Figs. 2 and 4, it will be seen that the web feed conveyor 8 consists of a pair of spaced side belts having the belts 15 located therebetween. Also, it will be observed that the conveyor 10 comprises pairs of side belts 20—20, and that the conveyor 9 comprises similar pairs of side belts 21—21. The side belt pairs of the conveyors 9 and 10 are so spaced as to be operative to grip between them the margins of the web of pad material so as to leave unobstructed for the slitting operation the central portion of the web. As is best shown in Fig. 1, the belts forming the conveyor 9 are guided by fore and aft rolls 22, 23, and by intermediate pulleys 24—24. The pulleys or shives 24 are carried by a shaft 25 which is journalled at its end in suitable bearing blocks 26 vertically slidably mounted in side frames 27—27 of the machine. Similarly, the conveyor 10 consists of spaced pairs of belts 20—20 which are guided by the pulleys 19 at the receiving end of the conveyor, rear or delivery end pulleys 28 and intermediate pulleys or shives 29. The upper and lower conveyors 9 and 10 are vertically aligned so that they are adapted to grip between them the margins of the absorbent web 1 which is fed between them. The lower shives or pulleys 29 are mounted on a shaft 30 which is journalled in suitable bearing blocks 31 vertically slidably mounted in slots such as indicated at 32 in the side frames of the machine, which slots also receive the bearing blocks 26 for the upper conveyor pulleys 24.

The shafts 25 and 30 carry means for slitting the web 1, the upper shaft 25 being provided with a drum 33 which has mounted in it a plurality of circumferentially spaced and radially disposed knives 34. As best shown in Fig. 5, the knives 34 have sharpened V-shaped cutting edges which extend across the length of the drum 33. Said knives and drum are of a length which will provide the desired slit lengths in the web, and the spacing of the knives from each other is such that the slits in the web will be spaced according to the desired pad widths.

The lower shaft 30 also has mounted on it a drum 35, and said drum has mounted in it a plurality of circumferentially spaced anvil bars 36 for cooperating with the respective knives 34. As best shown in Fig. 5, the anvil bars 36 are radially movably mounted in the lower drum 35 in such a manner that coil springs 37 are operative to normally urge and hold the respective anvil bars in a maximum outwardly projected condition determined by interengagement of the shoulders 38 on the anvil bars with stop members 39 suitably secured to the drum 35 substantially as shown. The arrangement is such that when a knife and an anvil bar are in cooperative relation, as shown in Fig. 5, the anvil bar will be pressed inwardly against the pressure of the springs 37, thereby assuring complete slitting through the web I without requiring the making of any fine adjustments of the cutting relationship between the knives and anvil bars. As indicated in Fig. 5, the blanket material will be partially compressed between the anvil bars and the surface of the upper roll 33 on opposite sides of the knives. This compression is preferably not so great as to effect permanent compression of the web material at the sides of the slit although it could readily be made permanent by employing a shallow knife and strong enough springs behind the anvil bars. It may be avoided, if desired, by channeling the anvil bar in alignment with the knife so as to cause the knife to cut through a web portion bridging the channel and not directly supported from below, and employing a sharper knife to cut completely through the web without any pinching of the web on the anvil bar.

The upper roll or drum 33 with its slitting knives is held against upward displacement by means of screws 40 which are threaded through cross members or caps 41 which extend over the upper open ends of the slots 32 in the side frames and are secured to said side frames. Locking nuts 42 on the screws 40 are provided for locking the screws in adjusted position. This arrangement permits a desirable amount of adjustment of the cutting pressure exerted by the knives on the anvil bars.

The web I of absorbent material moves continuously between the slitting rolls 33 and 35 and is delivered by the upper and lower conveyors 9 and 10 into the control of upper and lower conveyors 43 and 44, respectively. The upper and lower conveyors 43 and 44 each consists of a plurality of relatively spaced belts, the upper conveyor comprising, in this instance, four such belts 45, and the lower conveyor comprising, in this instance, four belts 46. The conveyors 43 and 44 have substantial parallel adjacent reaches 47 and 48 which travel continuously in the same direction and at the same rate of speed from receiving end pulleys 49 and 50, respectively, which are carried respectively by the upper and lower shafts 51 and 52 which also carry the pulleys 23 and 28 for the upper and lower conveyors 9 and 10. The receiving portions of said parallel reaches 47 and 48 first carry the slitted blanket material between means for compressing the areas 4 of the web margins intermediate the slits 5. Said compressing means comprises a pair of upper anvil rolls or discs 53—53 carried by a shaft 54 which is journalled in bearing blocks 55 vertically slidably mounted in the side frames of the machine.

Embossing or compressing wheels 56—56 are secured to a lower shaft 57 which is journalled in suitable bearing blocks such as shown at 58 which are mounted in the bottom of the vertical slot of the frame which also receives the said bearing blocks 55. The vertical position or elevation of the shaft 57 is normally fixed in the position determined by engagement of the bottom edges of the bearing blocks 56 with the bottom wall of the slots in the side frame in which said blocks are mounted. However, this position may be suitably adjusted by inserting suitable shims between the bearing block and the bottom of the slot (this being also true of the positioning of the shaft 30). The anvil rolls 53—53 may be suitably held down in the desired position as by means of adjustable screws 55a substantially corresponding to the above described adjusting screws 40.

The embossing rolls 56 are provided with radially extending, circumferentially spaced extensions 59 shaped to produce the desired shape of the compressed area, for example, the segment shaped area 4 shown in Fig. 3. The compression members 53 are so adjusted relative to each other that the areas 4 will be compressed to the desired extent, preferably to such an extent that the material will be permanently and substantially reduced in thickness more or less as set forth in said Glomstead patent. The compressing wheels 56 are made of such a diameter that the compressing projections 59 may be spaced apart the required distance to suitably space the compressed areas 4 and to locate them properly intermediate the slits 5.

Between the anvil rolls 53, the shaft 54 has mounted on it a plurality of pulleys or shives 60 suitably grooved to receive and guide the upper conveyor belts 45 through such a path of travel that they will be operative to adequately support the web portion intermediate the anvil rolls 53—53 during the web compressing operation. The lower conveyor belts 46 are so guided that they hold the said web I tightly against the overlying belts 45 as represented in Fig. 6 so that the web is effectively held during its travel between the compressing rolls and anvil rolls.

As best shown in Fig. 1, the conveyor reaches 47 and 48 extend around and upwardly from the belt guiding shives 60 so as to carry the slitted and compressed web upwardly. The said conveyor reaches are then trained over a pulley or drum 61 which is carried by the central portion of a drum 62 which is provided with a shaft 63 journalled at its ends in suitable side frame members of the machine. Said parallel conveyor reaches 47 and 48 are guided around approximately the upper half of said drum 62 and leave the same to discharge the blanket in a horizontal direction on a discharge conveyor 64 (Fig. 1). The reach 47 of the upper conveyor 43 leaves the drum 62 by being guided around a suitably grooved pulley 65 journalled in the side frames of the machine and thence around an idler pulley 66 and back to the receiving end of the upper conveyor. The idler pulley 66 is suitably adjustably mounted to permit adjustment of the tension on the belts of the conveyor 43 whereby the belts 45 may be caused to more or less squeeze the blanket I against the belts 46 of the lower conveyor during the travel of the web I around the drum 62.

The belts of the lower conveyor 44 leave the drum 62 by being guided around the said pulley 65 outwardly of the web material and thence downwardly around a suitably journalled guide pulley 67 and around an idler pulley 68 and back to the receiving end of the lower conveyor. The idler pulley 68 is also suitably adjustably mounted to facilitate adjustment of the tension on the lower conveyor belts 46 so that the same may be caused to cooperate with the upper conveyor belts to hold the web material as indicated.

The drum 62 has mounted on its opposite sides mechanism which notches margins of the web, as already explained, to cooperate with the slits therein to divide the web into separate pad sections. Said notching mechanism comprises a plurality of radially disposed and circumferentially spaced cutting mechanism units 69 mounted on the opposite sides of the drum 62. Each of said notching mechanisms comprises a main or mounting casting 70 which is secured by bolts 71 and 72 to the drum 62. Each casting 70 is provided with a seat 73 for receiving a die member 74 which may be considered a stationary or fixed die member with reference to a cooperating movable punch or cutting member. These die members may be bolted or otherwise suitably secured in fixed position on the seats 73 of the mounting members 70. The mounting members 70 are also provided with upwardly extending spaced ears 75—75 suitably apertured to receive short pivot pins or shafts 76 which in turn rotatably support cutter carrying members or levers 77. Said levers 77 have punches or cutting blocks 78 suitably mounted thereon for cooperation with the respective dies 74, the cutting members 78 and dies 74 being, of course, shaped to cut the desired more or less triangular edge portion from the margin of the web 1. In Fig. 7, the cutters 78 and dies 74 are shown in closed position with a cut-out marginal portion 6 pressed out of the web 1 and temporarily trapped between the cutter and die. The lever arm portion which carries the cutter 78 is also provided with a roller 79 suitably journalled on the lever and adapted to engage a cam bar 80 (one such bar 80 at each side of the machine) for moving the punch into the illustrated closed position relative to the die to thereby effect the web notching operation. Said cam bar 80 is secured to a stout and fixed bar or rod 81 carried by the machine side frames. The bar 81 is preferably in the form of a round rod and the cam members 80 are preferably so mounted thereon that they could be adjusted about the support 81, thereby to facilitate proper setting of the cam bars for effecting the cooperative action of the cutter 78 and its cooperating die 74.

As indicated in Fig. 1, the cam bar 80 has a split upper end which permits locking of the cam bar in selected position of adjustment on its supporting rod by means of a clamping bolt represented at 82. For further controlling the rotatably mounted punch carrying member 77, said member is provided with an end portion 83 equipped with a roller 84 suitably secured to said end portion. Said roller 84 is adapted to cooperate with a box cam 85 which has an entrance end for receiving the roller 84 at 86 (Fig. 1) and a discharge end at 87 where the roller 84 emerges from the cam to free the punch members for operation by the cam tracks 80.

Figure 8:
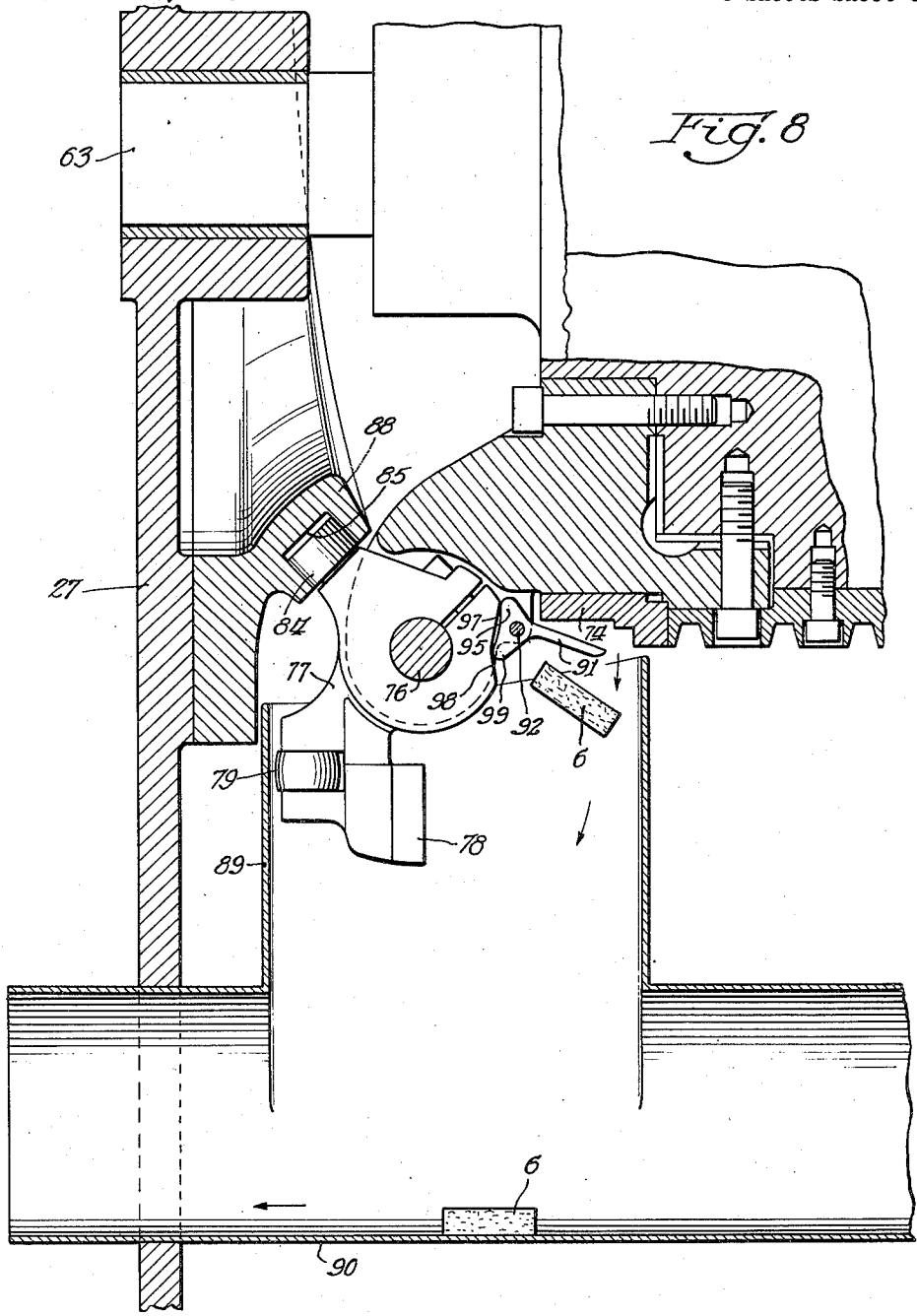
Fig. 8 is a section on the line 8—8 of Fig. 1.

The box cam 85 is formed in a member 88 which is secured to the inside of the side frame of the machine (see Fig. 8). The box cam 85 is so formed that the rotary die levers 77 will be held in an open position substantially as illustrated in Fig. 8 when they are at the web receiving side of the drum 62 so that they will not interfere with the movement of the web into position on the drum and in overlying relation to the fixed die members 74. The box cam gradually moves the rotatably mounted cutter member 77 from a closed position so that when the roller 84 leaves the box cam at the exit end 87 thereof, the rotatable cutter 78 will overlie the margin of the web in readiness for the cutting operation under the action of the heavy and stout cam members 80. After completion of the notch cutting operation, the cutter members 77 are freed from the control of the cam bars 80 and control thereof is again resumed by the entrance of the rollers 84 into the cam track 85. The entrance end portion of the box cam 85 is so formed that the cut-out web portion 6 will be temporarily held in the respective dies 74 until a position is reached for disposition of said notched-out pieces. It is preferred to discharge such notched-out pieces into a pneumatic conveyor system which consists, in this instance, of a receiving hopper 89 connected to a conduit 90 which is connected to a suitable suction system whereby the notched-out pieces 6 will be pneumatically conveyed to a desired collector or other apparatus. Accordingly, the box cam 85 is formed to open the successive cutter arms 77 when they reach a position overlying the mouth of the hopper 89.

To insure discharge of the notched-out pieces 6 from the dies, there is provided in each die unit an ejecting finger 91 which is pivoted as shown at 92 in the lever member 77 between suitable extensions 93 of its ears 75. Said ejector finger 91 is normally received in a recess 94 provided in the die block 84, and it is provided with a cam engaging end enlargement 95 for cooperating with a cam surface 97 formed in a portion of the hub of the cutter carrying member 77. As best shown in Fig. 8, said cam surface 97 is so formed that when the cutter carrying member 77 is moved to its open position, said cam surface will engage the end portion 95 of said ejecting finger to thereby effect rocking of the finger and ejection of the notched-out pieces 6. The hub of the member 77 is suitably recessed as shown at 98 to permit the other end portion 99 of the ejecting finger to move inwardly of the hub as required by the rocking movement of the finger. Said end portions 95 and 99 of the ejecting finger normally bear on a cylindrical surface portion of said hub as shown in Fig. 7. It will be apparent that when the member 77 is moved towards its closed position, the ejecting finger will also be restored to its seated position. The members 77 may be partially restored to a closed position so as to cause the fingers 91 to be seated in their respective recesses when the web 1 is delivered to the drum 62. This, however, is not essential since the finger 91 does not, in its ejecting position as shown in Fig. 8, extend materially beyond the normal web receiving circumference of the drum 62.

The removal of the triangular marginal pieces 6 completes the severance of the pad sections from the web so that when the web emerges from the margin between the pulleys 65 and 67, it is no longer a continuous web but a series of independent round-end pad units such as shown at 2 in Fig. 3. The conveyor 64 serves to conduct the units to mechanism for assembling the pads with other elements of the sanitary napkin or other article being produced, or to a receiving and storage receptacle or the like.

The described mechanism operates continuously and is free from the shocks and noise incident to intermittently operated equipment. Because of its continuous operation, it may be operated at a very high rate of speed. Also, it will be observed that the notching units are of relatively simple construction and readily replaceable when necessary as unitary mechanisms, all of the parts of each unit being carried by a single mounting element 70.

In the illustrated and above described arrangement, pad widths are cut from a web of material having a width which is the same as the length of the desired pads. It will be apparent that if preferred, pad lengths could similarly be cut from a web of pad material having a width corresponding to the desired pad width. In general, sanitary napkin pads are about 2¾ inches in width. In view of such width, it would be practicable to eliminate the slitting step and to merely notch the opposite margins of the strip or web, each notch extending half way across the width of the strip so as to cooperate to sever pad lengths from the web. If pressed cut pads are to be constructed, pressure rolls and anvils similar to those described may be employed, the pressure roll being suitably modified to properly space the pressed areas which would then be located centrally of the web at longitudinally spaced areas in accordance with the desired length of the pad. Such modified pad mechanism would also operate continuously and at high speed.

The various rotating parts of the mechanism described, and the various conveyors may be suitably driven by interconnecting chain drives and from a prime mover connected directly or otherwise to the notching drum. It is important that the notching drum, the embossing and anvil rolls, and the slitting rolls be driven in carefully timed relationship so as to properly locate the slits, embossed areas and notches, and to that end the said parts are preferably interconnected by gear or chain drives not herein shown but well understood in the mechanical art.

The conveyors are preferably maintained sufficiently taut on the various pulleys, rolls and drums to avoid material relative slippage which might tend to tear or otherwise injure the web of absorbent material being conveyed. The web of absorbent material may consist of a plurality of superposed plies of crepe tissue or it may be of composite construction embodying one or more layers of crepe tissue paper, each layer comprising a plurality of plies, and one or more intervening layers of other material such as fibrated wood pulp material now often known as fluff, cotton or other material having the desired absorption or other characteristics. The absorbent material is quite soft and easily compressed, and the parallel reaches of the conveyors 43 and 44 may actually compress the web slightly so as to more effectively hold the web, substantially as represented in Fig. 7. The cooperating reaches of the conveyors 9 and 10 may similarly grip the material to insure the proper holding of the web during the slitting operation.

Various changes in the described construction may be made without departing from the invention.

I claim:

1. The method of forming compressed end sanitary napkin pads which consists in feeding an elongated web of absorbent pad material in an endwise direction, slitting the central portion of the web and notching the opposite margins of the web in such transverse alignment that the slits and notches cooperate to sever from the end of the web sections of predetermined pad width, and before separating pad sections from the web, compressing predetermined areas of the web margins which subsequently become the end portions of separate pad sections.

2. The method of forming sanitary napkin pads which consists in propelling an elongated web of absorbent pad material in an endwise direction, transversely slitting the central portion of the web along lines spaced longitudinally of the web a distance equal to the desired pad width, compressing predetermined marginal areas of the pad intermediate prolongations of the lines of slitting to permanently reduce the thickness of the compressed areas, and then notching the margins of the web so as to produce notch formed web edges which communicate with the opposite ends of the slits, thereby separating from the end of the web compressed end pad units.

3. The method of making sanitary napkin pads which consists in continuously propelling an elongated web of pad material in an endwise direction, transversely slitting the central portion of the web along lines spaced longitudinally of the web a distance equal to the desired pad width, and notching the opposite margins of the web so as to produce notch formed web edges communicating with the opposite ends of said slits, thereby to effect complete severance from the web of end portions thereof constituting the desired pad units.

4. Apparatus for making sanitary napkin pads, comprising means for propelling an elongated web of pad material in an endwise direction, cooperating slitting members receiving the web therebetween and operative to transversely slit the central portion of the web along predetermined lines spaced longitudinally of the web and terminating in spaced relation to the side edges of the web, means for notching the side margins of the web in predetermined alignment and communication with the slits formed therein so as to effect complete severance from the web of an end portion thereof of predetermined width to form the desired pad.

5. Apparatus for producing absorbent pads comprising means for continuously propelling an elongated web of the desired pad material, continuously driven rotating means receiving the web between them and provided with cooperating elements serving to transversely slit the central portion of the web incident to its passage between said rotary means, rotating means for receiving the slitted web and continuing the endwise movement thereof, and notching mechanism carried by said rotating means for acting on the opposite margins of the web to notch the same in such alignment with the slits therein as to effect complete severance of the desired pad units from the leading end of said web.

6. Apparatus for producing absorbent pads comprising means for continuously propelling an elongated web of the desired pad material, continuously driven rotating means receiving the web between them and provided with cooperating elements serving to transversely slit the central portion of the web incident to its passage between said rotary means, rotary means acting on the margins of the moving web to permanently compress predetermined portions thereof, rotating means for receiving the slitted and compressed web and continuing the endwise movement thereof, and notching mechanism carried by said rotating means for acting on the opposite margins of the web to notch the same in such alignment with the slits therein as to effect complete severance of the desired pad units from the leading end of said web.

7. In apparatus of the class described, means for transversely slitting the central portion of a web of the desired pad material along lines spaced longitudinally of the web a distance corresponding to a desired dimension of the pads to be produced, comprising a pair of rolls journalled for rotation in opposite directions and adapted to pass the web between them, one of said rolls being provided with a plurality of circumferentially spaced, axially extending knives, and the other of said rolls being provided with a plurality of circumferentially spaced, axially extending anvil bars adapted to cooperate with said knives for slitting the pad material, the circumferential spacing of said knives and anvil bars corresponding substantially to the desired pad dimension, said knives projecting from the surface of said knife carrying roll a distance sufficient to enable the knife to cut through a predetermined web thickness, and said anvil bars being mounted in the anvil bar carrying roll for movement inwardly and outwardly thereof, there being also provided means for resiliently holding said anvil bars in an outwardly projecting position for cooperation with said cutting knives.

8. In apparatus for cutting a web of pad material into pad units, a rotatable member for guiding an endwise moving web of pad material through an arcuate path of travel, cutters movably mounted on and carried by said rotatable member for notching a margin of the web during its travel through said arcuate path, and means for actuating said movably mounted cutters during the rotation of said rotatable member.

9. In apparatus for cutting pad units from the leading end of a web of pad material, a rotary member adapted to receive and guide the web through a predetermined arcuate path of travel, a plurality of notching mechanisms movably mounted on said rotary member in circumferentially spaced positions thereon, said notching members being operative to notch a margin of the web during its travel through said arcuate path, and means for actuating said cutting members during said arcuate web travel.

10. In apparatus for cutting pad units from the leading end of a web of pad material, a rotary member adapted to receive and guide the web through a predetermined arcuate path of travel, a plurality of notching mechanisms carried by said rotary member in circumferentially spaced positions on said rotary member, said notching members being operative to notch a margin of the web during its travel through said arcuate path, and relative normal stationary cam means for actuating said notching members as an incident to their movement with said rotary member.

11. In apparatus for cutting pad units from the leading end of a web of pad material, a rotary member adapted to receive and guide the web through a predetermined arcuate path of travel, a plurality of notching mechanisms carried by said rotary member in circumferentially spaced positions on said rotary member, said notching members being operative to notch relatively independent web portions out of a margin of the web during its travel through said arcuate path and to displace said portions from the plane of the web as an incident to the notching operation, and means for receiving and conducting from the apparatus said independent notched-out portions of the web.

12. Apparatus for cutting predetermined pad sections from the leading end of a continuously moving web of pad material, comprising a rotatable drum, means for conducting a web of pad material to a surface portion of said drum for movement therewith through an arcuate path of travel, web notching mechanisms carried by said drum, said notching mechanisms having a normally fixed die and a movable punch for cooperating with said die to notch from the web the desired portions thereof, the notched-out portions of the web being trapped between said die and punch incident to the notching operation, means constituting a part of said notching mechanism for ejecting said trapped notched-out pieces upon opening of the notching mechanism, means for actuating said ejector as an incident to movement of said punch member to open position, and means for receiving and carrying away the ejected notched out web pieces.

13. Apparatus of the class described comprising slitting mechanism having a cooperating pair of rotating drums provided respectively with slitting knives and anvil bars of such length and so located in the drums as to transversely slit the central portion of an elongated web of material fed between said drums, a rotatable notching drum provided at its opposite ends with a plurality of circumferentially spaced mechanisms for notching the margins of said web, and means for feeding the web issuing from said slitting drums to said notching drum so as to effect predetermined alignment of the slits in the web with said notching mechanisms, whereby when the margins of the web are notched sections of the pad in advance of the respective slits will be completely severed from the web to thereby form the desired pad units.

14. Apparatus according to claim 13 wherein there is provided rotary mechanism for compressing marginal areas of the web intermediate prolongations of the slits produced in the web by said slitting drums and wherein said compressing mechanism is positioned to act on the web after the slitting drums and prior to the notching mechanisms, whereby the pad units produced are provided with compressed end portions.

15. Apparatus according to claim 13 wherein there is provided a pair of web conveying belts having substantially parallel adjacent reaches arranged to grip between them the central slitted portion of the web, said conveyor reaches being guided around the surface of said notching drum for holding the web in operative relation to said notching mechanisms.

RUDOLF G. MINARIK.

REFERENCES CITED

The following references are of record in the file of this patent:

UNITED STATES PATENTS

| Number | Name | Date |
| --- | --- | --- |
| 854,440 | Swift | May 21, 1907 |
| 1,136,758 | Ballard | Apr. 20, 1915 |
| 1,487,662 | Langston | Mar. 18, 1924 |
| 1,837,727 | Novick | Dec. 22, 1931 |
| 2,040,799 | Swift | May 12, 1936 |
| 2,145,048 | Hagen | Jan. 24, 1939 |